(12) United States Patent
Tan et al.

(10) Patent No.: US 11,058,140 B2
(45) Date of Patent: Jul. 13, 2021

(54) APPARATUS AND METHOD FOR ROASTING COFFEE BEANS, AND COFFEE MACHINE

(71) Applicant: KONINKLIJKE PHILIPS N.V., Eindhoven (NL)

(72) Inventors: Jingwei Tan, Eindhoven (NL); Jun Shi, Eindhoven (NL); Yanyan Wang, Eindhoven (NL); Jun Zhou, Eindhoven (NL); Declan Patrick Kelly, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 339 days.

(21) Appl. No.: 15/512,112

(22) PCT Filed: Sep. 6, 2015

(86) PCT No.: PCT/EP2015/070310
§ 371 (c)(1),
(2) Date: Mar. 17, 2017

(87) PCT Pub. No.: WO2016/041794
PCT Pub. Date: Mar. 24, 2016

(65) Prior Publication Data
US 2017/0318854 A1    Nov. 9, 2017

(30) Foreign Application Priority Data
Sep. 19, 2014   (WO) ................ PCT/CN2014/086896
Oct. 22, 2014   (EP) ..................................... 14189832

(51) Int. Cl.
*A23N 12/00* (2006.01)
*A23N 12/08* (2006.01)
(Continued)

(52) U.S. Cl.
CPC ................ *A23N 12/08* (2013.01); *A23F 5/04* (2013.01); *A23F 5/26* (2013.01); *A23N 12/125* (2013.01);
(Continued)

(58) Field of Classification Search
CPC .... A47J 31/42; F26B 3/02; F26B 2/06; F26B 13/008; F26B 17/18; A23N 12/08; A23F 5/04
(Continued)

(56) References Cited

U.S. PATENT DOCUMENTS 3,434,223 A * 3/1969 Moller .................... F26B 21/06
250/214 R
4,602,147 A    7/1986 Gell
(Continued)

FOREIGN PATENT DOCUMENTS

CN    1045373 A    9/1990
CN    203502782 U    3/2014
(Continued)

OTHER PUBLICATIONS

Office Action issued in connection with corresponding 201580050575.7, dated Nov. 15, 2018, 10 pages.
(Continued)

*Primary Examiner* — Reginald Alexander
(74) *Attorney, Agent, or Firm* — Schott, P.C.

(57) ABSTRACT

A apparatus (100) for roasting coffee beans is disclosed comprising a compartment (110) for holding coffee beans (10); a roasting element (140) for roasting the coffee beans in said compartment; and a processor (130) comprising a control unit (134) for controlling the roasting element. Wherein, the processor (130) is adapted to determine a weight loss rate of the coffee beans, and the control unit (134) is adapted to control the roasting element as a function
(Continued)

of the determined weight loss rate. A coffee machine including such an apparatus and a method for roasting coffee beans are also disclosed.

15 Claims, 5 Drawing Sheets

(51) Int. Cl.
*A47J 31/42* (2006.01)
*A23N 12/12* (2006.01)
*A23F 5/04* (2006.01)
*A23F 5/26* (2006.01)
*A47J 31/44* (2006.01)
*F26B 13/00* (2006.01)

(52) U.S. Cl.
CPC ............... *A47J 31/42* (2013.01); *A47J 31/44* (2013.01); *F26B 13/008* (2013.01)

(58) Field of Classification Search
USPC .... 99/286; 34/536, 524, 528, 546, 586, 386, 34/483
See application file for complete search history.

(56) References Cited

U.S. PATENT DOCUMENTS

| | | | |
|---|---|---|---|
| 4,895,308 A | 1/1990 | Tanaka | |
| 5,322,005 A | 6/1994 | Enomoto | |
| 5,970,209 A | 10/1999 | Toyokura | |
| 6,104,494 A | 8/2000 | Torbet | |
| 6,106,877 A | 8/2000 | Allington | |
| 6,141,888 A * | 11/2000 | Cammarata | F26B 25/225 34/202 |
| 6,260,479 B1 | 7/2001 | Friedrich | |
| 7,285,300 B1 | 10/2007 | Allington | |
| 2004/0074400 A1 | 4/2004 | Song | |
| 2013/0276637 A1 | 10/2013 | Stordy | |
| 2014/0242239 A1 | 8/2014 | Boggavarapu | |
| 2016/0120211 A1* | 5/2016 | Wilson | A23N 12/125 426/233 |
| 2016/0338376 A1* | 11/2016 | Kelly | A23F 5/04 |

FOREIGN PATENT DOCUMENTS

| | | |
|---|---|---|
| DE | 9306689 U1 | 9/1994 |
| DE | 10142297 A1 | 4/2002 |
| EP | 0040823 A1 | 12/1981 |
| EP | 1374704 B1 | 7/2007 |
| EP | 1949804 A2 | 7/2008 |
| GB | 209665 A | 1/1924 |
| GB | 2485073 A | 5/2012 |
| JP | H03-051630 A | 3/1991 |
| JP | H04-311349 A | 11/1992 |
| JP | 0975228 A | 3/1997 |
| JP | 2013072637 A | 4/2013 |
| JP | 2013158472 A | 8/2013 |
| RU | 2203553 C1 | 5/2003 |
| WO | 0174210 A1 | 10/2001 |
| WO | 2014043652 A1 | 3/2014 |

OTHER PUBLICATIONS

Office Action issued in connection with corresponding 2015317099, dated May 28, 2019, 3 pages.

* cited by examiner

APPARATUS AND METHOD FOR ROASTING COFFEE BEANS, AND COFFEE MACHINE

This application is the U.S. National Phase application under 35 U.S.C. § 371 of International Application No. PCT/EP2015/070310, filed on Sep. 6, 2015, which claims the benefit of International Application No. 14189832.0 filed on Oct. 22, 2014 and International Application No. PCT/CN2014/086896 filed on Sep. 19, 2014. These applications are hereby incorporated by reference herein.

FIELD OF THE INVENTION

The present invention relates to an apparatus for roasting coffee beans comprising a compartment for holding coffee beans; a roasting element for roasting the coffee beans in the compartment; and a processor comprising a control unit for controlling the roasting element.

The present invention further relates to a coffee machine comprising such an apparatus for roasting coffee beans.

The present invention yet further relates to a method of roasting coffee beans.

BACKGROUND OF THE INVENTION

Coffee has become one of the most popular beverages in modern society, with many different types and flavours of coffee being routinely available to a consumer, either in outlets such as coffee shops or in supermarkets for domestic use. The evolution of the popularity of coffee as a beverage has caused a shift in how coffee is being consumed, for instance in domestic settings.

Whereas in the past coffee would be predominantly brewed from instant coffee granules or from packaged ground coffee powders, e.g. using domestic coffee makers such as espresso machines or filter machines, nowadays a greater emphasis is placed on the freshness of the brewed coffee, which has triggered a rise in popularity of coffee roasting apparatuses. In such an apparatus, fresh, i.e. green, coffee beans can be roasted by a thermal process, e.g. using hot gases or by physical contact with a hot surface. During roasting at temperatures above 170° C., water is redistributed, and complex chemical reactions such as Maillard reaction and pyrolysis are induced. A fresh coffee powder can then be formed by grinding the freshly roasted coffee beans, thereby facilitating the brewing of fresh coffee. Such coffee is typically considered to have a superior taste compared to coffee brewed from packaged ground coffee powders.

Existing coffee roasting apparatuses such as the Nesco® Model CR-1000 Series of coffee roasters allow the user to specify the roasting time of the coffee beans in order to achieve the desired roasting result. Other roasting apparatuses offer control over the roasting process by allowing the user to specify the roasting temperature. However, the coffee beans used for roasting may either be green or may be partially roasted to different roasting degrees, as many coffee bean retailers are now offering partially roasted coffee beans for further roasting by the end user. Also, different varieties of coffee beans or even coffee beans of a particular variety from different harvests may require different roasting conditions, e.g. different roasting times, from a comparable starting point to achieve a comparable degree of roasting. These challenges make it difficult for a user to select the appropriate roasting times for the coffee beans in order to arrive at the desired roasting level of the beans.

Prior art solutions such as disclosed in U.S. Pat. No. 7,285,300 B1 and U.S. Pat. No. 6,106,877 A determine the color of the coffee beans during the roasting process to achieve a consistent roasting result. However, a similar surface color for different varieties coffee beans may correspond to different levels of roasting, such that this does not guarantee a satisfactory consistency in the roasting process.

SUMMARY OF THE INVENTION

The present invention seeks to provide an apparatus for roasting coffee beans that may produce coffee beans that are roasted to a desired roasting degree in a consistent manner.

The present invention further seeks to provide a coffee machine comprising such an apparatus for roasting coffee beans.

The present invention yet further seeks to provide a method of roasting coffee beans in a consistent manner.

According to an aspect, there is provided an apparatus for roasting coffee beans comprising a compartment for holding coffee beans; a roasting element for roasting the coffee beans in the compartment; and a processor comprising a control unit for controlling the roasting element, wherein the processor is adapted to determine a weight loss rate of the coffee beans, and the control unit is adapted to control the roasting element as a function of the determined weight loss rate of the coffee beans.

The present inventors have realized that the weight loss rate of the coffee beans is particularly indicative of the roasting degree of the coffee beans, i.e. the weight loss rate is a function of the roasting degree, such that the roasting degree of the coffee beans may be accurately determined from the determined weight loss rate.

The apparatus may further comprise a sensor for monitoring the weight of the coffee beans in said compartment, wherein the processor is adapted to determine the weight loss rate in response to the sensor.

The processor may further comprise a timer unit responsive to the sensor for determining the time elapsed between a first weight measurement of the coffee beans and a subsequent weight measurement at which the first weight of the coffee beans has reduced by a defined amount. This is a particularly straightforward and cost-effective configuration for determining the weight loss rate of the coffee beans.

The timer unit may be adapted to determine the elapsed time from a series of weight measurements including the first weight measurement and the subsequent weight measurement. The processor may further comprises a rate calculation unit communicatively coupled to the timer unit and adapted to calculate a weight loss rate from the determined elapsed time. This allows for a more accurate and/or elaborate determination of the weight loss rate.

The processor may further comprise a roast degree determination unit responsive to the rate calculation unit and adapted to determine a roasting degree of the coffee beans based on the calculated weight loss rate.

The timer unit may be adapted to determine a subsequent time elapsed between a first further weight measurement of the coffee beans and a subsequent further weight measurement at which the first further weight of the coffee beans has reduced by a defined further amount from a subsequent series of weight measurements; and the rate calculation unit may be adapted to calculate a weight loss rate from the determined elapsed time and the determined subsequent elapsed time. This for instance facilitates the determination of time-dependent variations in the weight loss rate, such that a weight loss profile may be determined for the coffee beans, which may further aid the determination of the time-dependent roasting degree of the coffee beans.

The present inventors have also realized that coffee beans exhibits different weight loss rates during the various roasting stages of the coffee bean roasting process. Consequently, the roasting degree of the coffee beans during the roasting process may be determined by determining the weight loss rate of the coffee beans when processing the roasting in the apparatus, such that the appropriate roasting process for the coffee beans may be selected from the determined roasting degree as determined from the weight loss rate of the coffee beans.

To this end, the control unit may for instance be adapted to select a roasting profile for the coffee beans as a function of the determined roasting degree of the coffee beans residing in the compartment, such that an appropriate roasting profile can be applied to the coffee beans based on the determined roasting degree.

Alternatively or additionally, as the coffee beans exhibit a typical weight loss profile that is closely associated with the roasting degree of the coffee beans, the control unit may be adapted to disengage the roasting element as a function of the determined roasting degree and a desired roasting degree. In this embodiment, the the roasting process may be controlled using the determined time-dependent roasting degree as a control parameter, wherein the roasting process may be terminated once the coffee beans achieve the desired roasting degree. It has been found that controlling the roasting process in this manner yields excellent consistency in the roasting results.

In another embodiment, the processor may be further adapted to define a weight loss from the coffee beans as a function of the determined roasting degree and a desired roasting degree, and the control unit may be adapted to disengage the roasting element in response to the defined weight loss from the coffee beans. In this embodiment, the roasting process may be controlled using weight loss as a control parameter, wherein the roasting process may be terminated once the coffee beans have lost the defined weight loss. It has been found that controlling the roasting process in this manner yields excellent consistency in the roasting results.

The control unit may be adapted to disengage the roasting element after a defined amount of time following a defined weight loss from the coffee beans. This may further improve the consistency of the roasting process, for instance if the weight loss during the final roasting stages is modest, in which case roasting the coffee beans for a defined amount of time from an intermediate weight loss reference point in the roasting process may achieve a higher accuracy in obtaining the desired roasting degree.

Alternatively or additionally, the weight loss rate may comprises an initial weight loss rate determined at an initial stage of roasting process, and the control unit may be adapted to control the roasting element as a function of the determined initial weight loss rate of the coffee beans. In this embodiment, the initial roasting degree of the coffee beans may be determined by determining the initial weight loss rate when initiating the roasting process in the apparatus, such that the appropriate roasting profile for the coffee beans may be selected from the initial degree as determined from the initial weight loss rate at the initial stage of roasting. Additionally, the processor may be further adapted to define a total weight loss of the coffee beans from initiating the roasting process as a function of the determined initial roasting degree and a desired roasting degree, and the roasting process may be terminated once the coffee beans have lost the defined total weight loss.

The coffee roasting apparatus may further comprise a user interface for receiving input from a user regarding a desired roasting degree of the coffee beans, wherein the control unit is responsive to the user interface. This allows a user of the coffee roasting apparatus to specify the desired roasting degree of the coffee beans, thereby increasing the flexibility of the roasting functionality of the apparatus.

According to another aspect, there is provided a coffee machine comprising an apparatus according to one or more of the aforementioned embodiments for roasting coffee beans, a grinding device for grinding the roasted coffee beans to coffee powder, and a brewing device for brewing coffee from the coffee powder. Such a coffee machine benefits from the improved consistency in the roasting of the coffee beans by the coffee roasting apparatus, thereby providing a coffee machine that can brew coffee with an improved consistency in taste.

According to yet another aspect, there is provided a method of roasting coffee beans, the method comprising roasting the coffee beans; determining a weight loss rate during the roasting; selecting a roasting profile for the coffee beans based on the determined weight loss rate; and completing the roasting of the coffee beans using the selected roasting profile. This ensures a consistent roasting result of the coffee beans regardless of their initial roasting degree.

In an embodiment, the step of determining a weight loss rate of the coffee beans during the roasting may comprise monitoring the weight of the coffee beans, determining a time elapsed between a first weight measurement of the coffee beans and a subsequent weight measurement at which the first weight of the coffee beans has reduced by a defined amount; and calculating the weight loss rate from the determined elapsed time.

Alternatively or additionally, the step of selecting a roasting profile may comprise defining a weight loss for the coffee beans in response to the determined weight loss rate, and the step of completing the roasting of the coffee beans may comprise terminating the roasting of the coffee beans upon the coffee beans having lost the defined weight loss. It has been found that controlling the roasting process as a function of coffee bean weight loss may yield excellent consistency in the coffee bean roasting results.

Additionally, the step of determining a weight loss rate may comprise determining an initial weight loss rate at an initial stage of roasting, and the step of selecting a roasting profile for the coffee beans comprises selecting a roasting profile on the basis of the determined initial weight loss rate.

BRIEF DESCRIPTION OF THE DRAWINGS

Embodiments of the invention are described in more detail and by way of non-limiting examples with reference to the accompanying drawings, wherein.

DETAILED DESCRIPTION OF EMBODIMENTS

Figure 1:
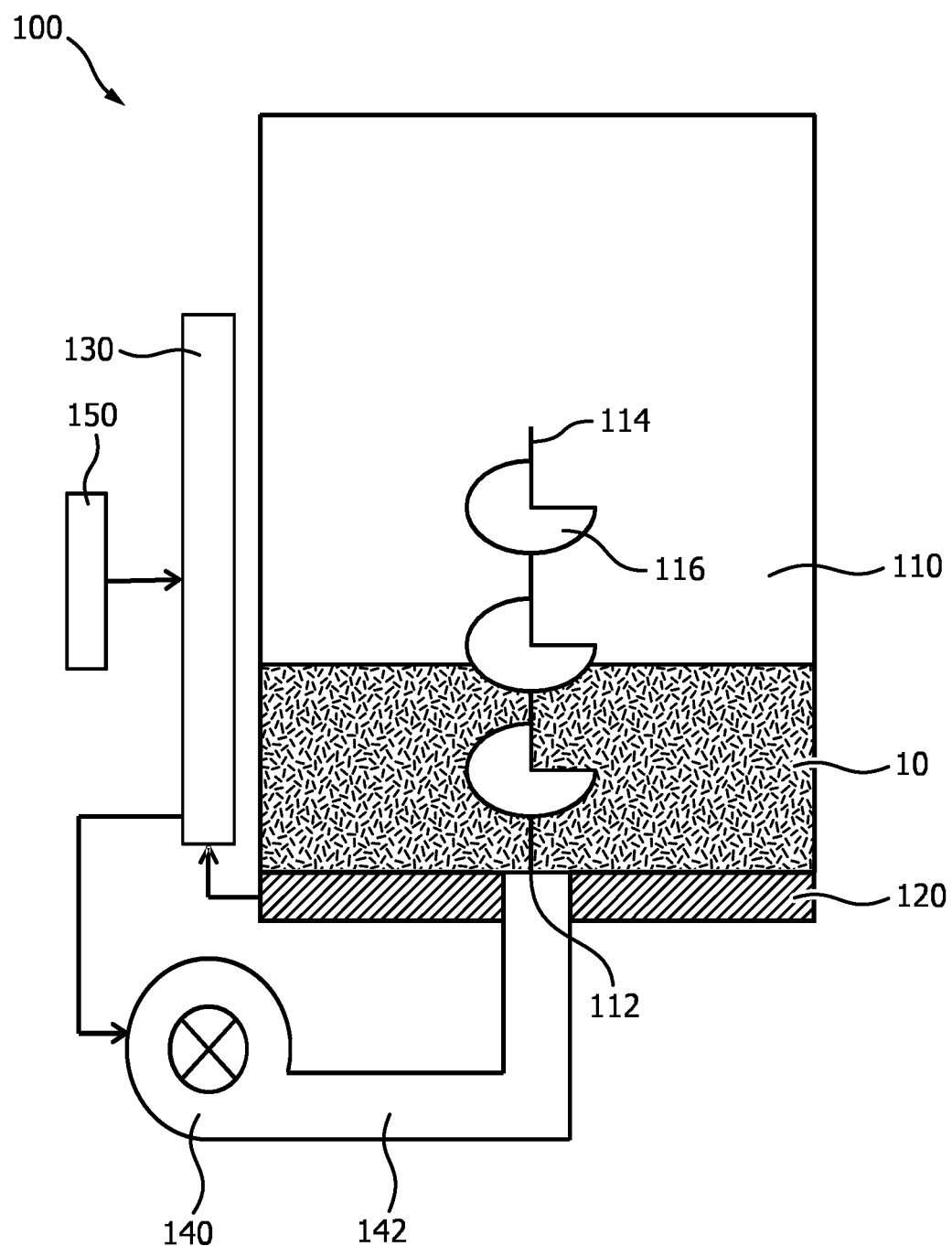
FIG. 1 schematically depicts a coffee roasting apparatus according to an embodiment.

It should be understood that the Figures are merely schematic and are not drawn to scale. It should also be understood that the same reference numerals are used throughout the Figures to indicate the same or similar parts.

FIG. 1 schematically depicts an apparatus 100 for roasting coffee beans according to an embodiment. The apparatus 100 typically comprises a compartment 110 for storing coffee beans 10 therein. The compartment 110 may further comprise a stirring arrangement including stirring members, e.g. agitating blades 116, mounted on or otherwise affixed to a stirring bar 114 to stir the coffee beans 10 during the roasting process of the coffee beans. This stirring arrangement assists in ensuring a homogeneous roasting of the coffee beans 10 in the compartment 110. The stirring arrangement may be controlled in any suitable manner, for instance by a processor 130 including a control unit 134, which is schematically shown in further detail in FIG. 3, which will be described simultaneously.

The apparatus 100 typically further comprises a heating arrangement, i.e. roasting element, for heating the coffee beans 10 during the roasting process. In an embodiment, the heating arrangement may be controlled by the control unit 134. The heating arrangement ensures that the coffee beans 10 are heated to an appropriate temperature at which the roasting of the coffee beans 10 takes place, i.e. an appropriate temperature at which the desired chemical reactions such as the Maillard reaction and pyrolytic reactions take place. In FIG. 1, the heating arrangement, i.e. roasting element, is embodied by a hot air generator 140 connected to an inlet 112 of the compartment 110 via a conduit 142 by way of non-limiting example only. In this embodiment, the inlet 112 is typically arranged such that the hot air is guided through the coffee beans 10 during the roasting process, e.g. when stirring the coffee beans 10 using the stirring arrangement. The inlet 112 may comprise a fine grid or the like to prevent coffee beans 10 from entering the conduit 142.

Figure 2:
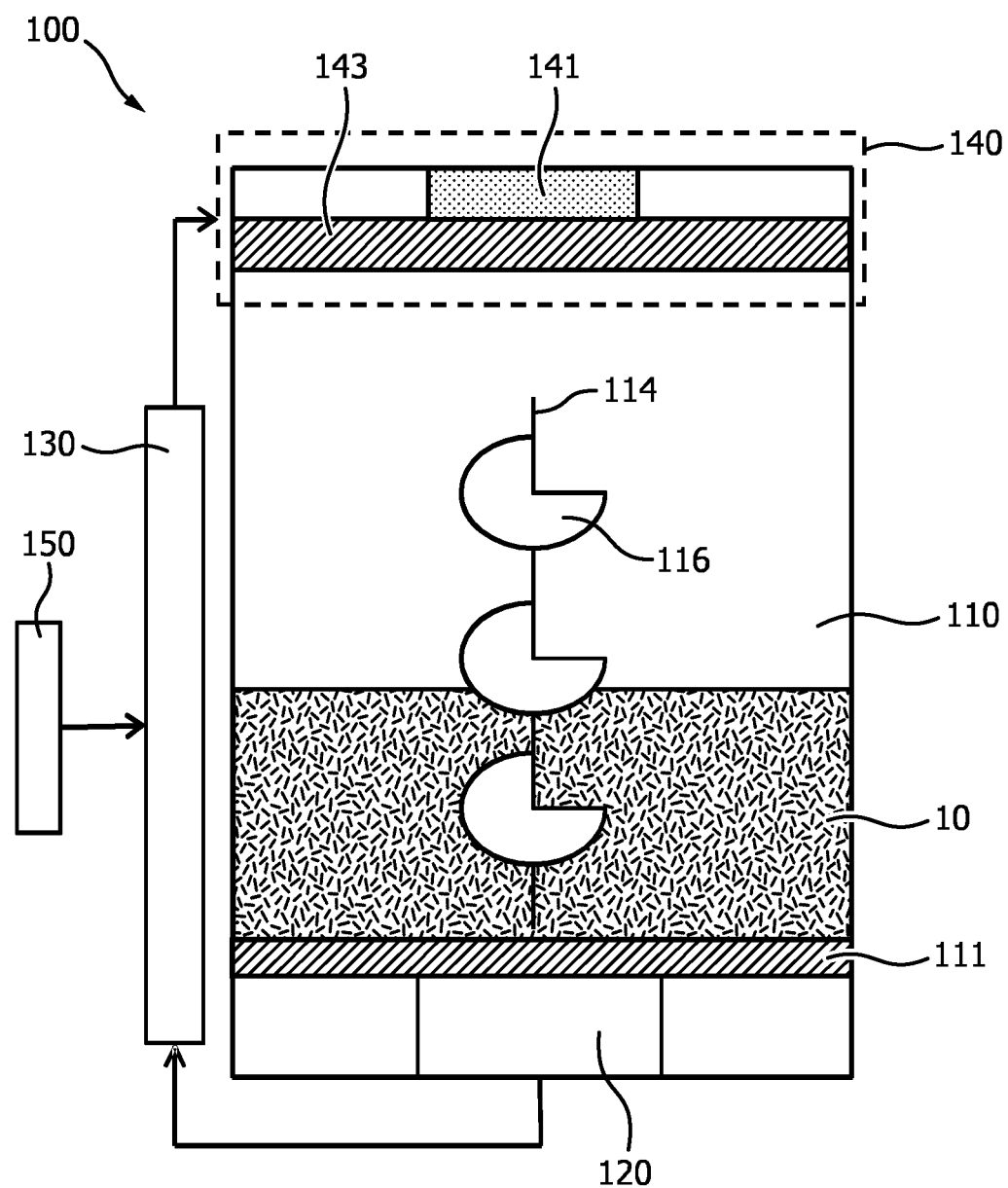
FIG. 2 schematically depicts a coffee roasting apparatus according to another embodiment.

However, it should be understood that any suitable heating arrangement, i.e. roasting element, for heating the coffee beans 10 may be used, such as one or more heating elements attached to or integrated into the one or more walls of the compartment 110, in which case the inlet 112 may be omitted. For instance, as shown in FIG. 2, the heating arrangement 140 may comprise an electric fan 141 and a heating element 143 included in the compartment 110, which heating element 143 may be operated independently from the electric fan 141, for instance to facilitate cooling of the coffee beans 10 upon completion of the roasting process by disengaging the heating element 143 only to quench any of the heat-induced chemical reactions associated with the roasting process. As such heating arrangements or roasting elements are well-known per se, they will not be explained in further detail for the sake of brevity only.

The processor 130 is adapted to determine a change rate of weight loss of the coffee beans, and the control unit (134) is adapted to control the heating arrangement at least partially in response to the change rate of weight loss of the coffee beans 10 residing in the compartment 110 during the roasting process, i.e. as a function of the determined weight loss rate caused by moisture loss and/or chemical reactions in the coffee beans 10. In an embodiment, in order to facilitate such a control mechanism, the apparatus 100 may comprise a sensor 120, which may be mounted in any suitable location of the compartment 110, e.g. in or at the bottom of the compartment 110. The sensor 120 is typically adapted to sense the overall weight of the coffee beans 10 in the compartment 110. In an embodiment, the sensor 120 is a weight sensor. As shown in FIG. 2, the sensor 120 may cooperate with the floor 111 of the compartment 110, e.g. the sensor 120 may include a resilient element, e.g. a spring or the like, which compression is a function of the load on the floor 111. The degree of compression may be measured to determine this load, i.e. the weight of the coffee beans 10. Other suitable embodiments of such a weight sensor will be apparent to the skilled person. As such weight determination sensors are well-known per se, this will not be explained in any further detail for the sake of brevity. It suffices to state that any suitable weight sensor may be used for this purpose.

The inventors have found that the weight loss rate of the coffee beans 10 is characteristic for the roasting degree of the coffee beans 10. In other words, different stages of the roasting process of coffee beans 10 exhibit different weight loss rate characteristics, e.g. by means of the sensor 120 allows for the identification of the time-dependent roasting degree of the coffee beans 10 placed in the compartment 110 of the apparatus 100. For an instance, the determination of the weight loss rate at the initial stage of the operation of the coffee roasting would be used to identify the initial roasting degree of the coffee beans, e.g. green beans or partially roasted beans.

Without wishing to be bound by theory, it is believed that coffee beans 10 at different partial roasting levels contain different amounts of moisture and have different densities. The drier the coffee beans 10, the more time is required for the coffee beans 10 to lose a certain amount of weight. For instance, the drier partially roasted coffee beans 10 will require more time to lose the same amount of weight compared to for instance green coffee beans 10 having a higher moisture content, as it is easier to release a unit amount of moisture from the green coffee beans. Table I gives a typical moisture content of coffee beans at various levels of partial roasting. In Table I, p-1, p-2 and p-3 indicate different partial roasting degrees with a higher number indicating a higher level of partial roasting. A lower moisture content of the coffee beans 10 corresponds to the beans having a lower weight.

TABLE I

| Partial roasting level | Moisture content (wt %) |
| --- | --- |
| p-3 | 3.20 |
| p-2 | 4.30 |
| p-1 | 7.70 |
| Green | 10-13 |

Figure 4:
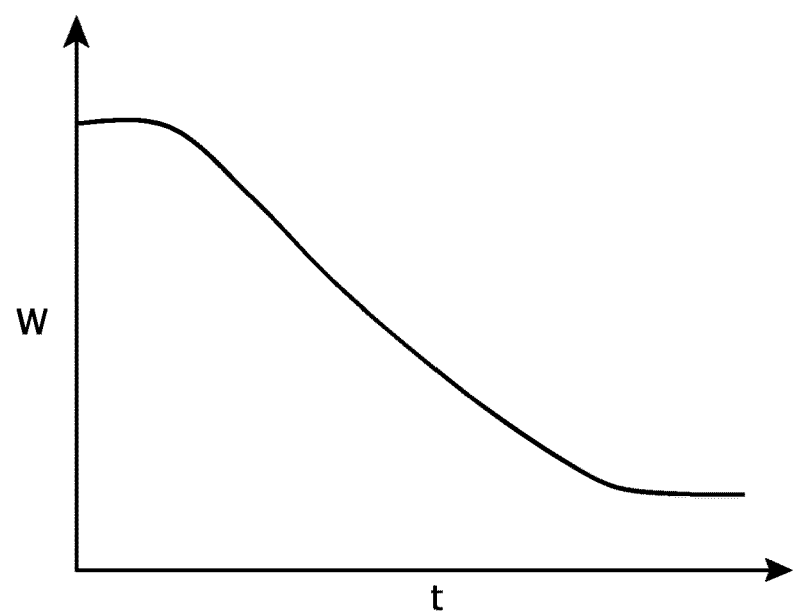
FIG. 4 schematically depicts a graph of coffee bean weight (W) over time (t) during roasting.

This is further demonstrated in FIG. 4, which schematically depicts the change in weight W of the coffee beans 10 as a function of time t during a roasting process. Two trends are immediately apparent; firstly the coffee beans 10 gradually lose weight during the roasting process. It has been found that the degree of weight loss is reproducible and correlated to the roasting degree of the coffee beans 10, such that the roasting process can be controlled by monitoring the weight loss in the coffee beans 10. For instance, the roasting of the coffee beans 10 may be terminated once the coffee beans 10 have lost a target amount of weight, e.g. an absolute amount or a percentage amount of their initial weight, as the amount of weight loss can be correlated to the coffee beans 10 having reached a desired degree of roasting.

By controlling the entire roasting process in this manner, excellent consistency in the roasting results may be achieved.

This is further demonstrated in Table II, which depicts the example weight loss from coffee beans having different initial roasting levels for different target roasting levels. Varying degrees partially roasted coffee beans have been considered, with a deeper partial roast being characterized by a lower moisture content (level) in the coffee beans 10.

TABLE II

| Roasting degree | Green coffee beans (moisture level 12 wt %) | Partially roasted coffee beans (moisture level 7-8 wt %) | Partially roasted coffee beans (moisture level 5-6 wt %) | Partially roasted coffee beans (moisture level 3-4 wt %) |
|---|---|---|---|---|
| 1 | 12% | 6% | 4% | 2% |
| 2 | 14% | 8% | 6% | 4% |
| 3 | 16% | 10% | 8% | 6% |
| 4 | 18% | 12% | 10% | 8% |
| 5 | 20% | 14% | 12% | 10% |
| 6 | 22% | 16% | 14% | 12% |
| 7 | 24% | 18% | 16% | 14% |

As is demonstrated by Table II, once a desired roasting degree is defined, and the roasting degree of the coffee beans 10 has been determined at a stage of roasting process, a target amount of weight loss can be defined as a function of the determined roasting degree and the desired roasting degree, and the desired roasting degree can be achieved by monitoring the weight loss from the coffee beans. In one embodiment, once the initial roasting degree of the coffee beans 10 is determined at the initial stage, the total amount of weight loss from the initial weight of the coffee beans can be defined. The desired roasting degree can be achieved upon the coffee beans 10 having lost the defined total amount of weight loss, and the roasting process is terminated. For instance, starting from green coffee beans and requiring a target roasting degree 5, the roasting process may be terminated once the coffee beans 10 have lost 20% of their initial weight. Starting from medium partially roasted coffee beans 10, i.e. having a moisture content of 5-6% by weight, and requiring a target roasting degree 6, the roasting process may be terminated once the coffee beans 10 have lost 14% of their initial weight.

Secondly, it can be seen from FIG. 4 that at different stages of the roasting process the coffee beans 10 lose weight at different rates. Therefore, it is possible to determine the roasting degree of the coffee beans 10 by determining the rate at which the coffee beans 10 lose weight at each different stage. This for instance may be used to control the further roasting process, e.g. to determine the roasting profile to which the coffee beans 10 should be exposed in order to achieve the desired roasting degree of the coffee beans 10. In one embodiment, the initial roasting degree of the coffee beans 10 is determined by the initial weight loss rate at the initial stage of roasting, and an appropriate roasting profile can be selected for controlling the further roasting process, in order to achieve the desired roasting degree excellently.

Such a roasting profile may for instance include information regarding the temperature and the duration of the subsequent roasting process, and may additionally or alternatively contain information regarding the target amount of weight loss from the coffee beans 10. For instance, the processor 130 may be adapted to determine the initial weight of the coffee beans 10, determine the initial weight loss rate from the coffee beans 10 to determine the initial degree of roasting of the coffee beans 10 and determine a target reduction in weight from the initial weight of the coffee beans 10 corresponding to the desired (target) roasting degree of the coffee beans 10, wherein the control unit 134 may be arranged to disengage the roasting element 140 once this target amount of weight loss from the coffee beans 10 has been sensed by the sensor 120 and determined by the processor 130.

In an embodiment, the sensor 120 is adapted to periodically sense the weight of the coffee beans 10 in the compartment 110. Any suitable time period between subsequent weight measurements may be applied; for instance, the sensor unit 120 may be arranged to perform such periodic measurement at a frequency of several times per minute, e.g. once per second or less, e.g. a frequency in a range of 0.05-1.0 Hz, e.g. at a frequency of once per second or more, e.g. a frequency in a range of 1.0-50 or 60 Hz and so on. This for instance facilitates the determination of the weight loss rate of the coffee beans 10.

For this purpose, the processor 130 may include a timer unit 131 adapted to determine the amount of time elapsed between a first weight measurement and a subsequent weight measurement performed by the sensor 120, wherein the weight of the coffee beans 10 has reduced by a defined amount between the first weight measurement and the subsequent weight measurement. This for instance allows for the determination of a weight loss rate of the coffee beans 10, e.g. by dividing the determined weight loss by the duration of the weight loss, i.e. the time it took for the coffee beans 10 to lose the defined amount of weight.

In an embodiment, the timer unit 131 is configured to determine a series of timings of such defined amounts of weight loss from a series of weight loss determinations by the sensor 120. For instance, the processor 130 may further comprise a rate calculation unit 132 for calculating a weight loss rate of the coffee beans 10 from a series of timings determined by the timer unit 131, wherein each timing is indicative of the coffee beans 10 having lost a defined amount of weight, e.g. 0.1 g for a volume of 10 g of coffee beans 10 in the compartment 110, a weight loss of 1% of the first weight of the coffee beans 10 as sensed by the sensor 120 and so on. Such a series of N weight loss points, wherein N is a positive integer having a value of at least 2, e.g. N=2, 5, 10, 15 or 20 and so on.

As mentioned above, the weight loss rate of the coffee beans 10 as derived from such a series of weight loss points can be used to determine a roasting degree of the coffee beans 10, e.g. the initial roasting degree at the initial stage of roasting. To this end, the processor 130 may further comprise a roast degree determination unit 133 responsive to the rate calculation unit 132.

In an embodiment, the roasting degree determined by the roast degree determination unit 133 may be verified by a subsequent series of timings performed by the timing unit 131. To this end, the timing unit 131 may determine a series of further timings of a series of further defined amounts of weight losses from a series of further weight loss determinations by the sensor 120, from which the rate calculation unit 132 may derive a further weight loss rate, which further weight loss rate may be used by the roast degree determination unit 133 to verify if the originally determined roasting degree of the coffee beans 10 was correct. The further weight loss rate may thus be used by the roast degree determination unit 133 to correct the originally determined roasting degree of the coffee beans 10.

Alternatively, the first series of timings and the subsequent series of timings determined by the timer 131 may be used to determine a change in the rate of weight loss of the coffee beans 10 by the rate calculation unit 132, which weight loss rate change, e.g. weight loss rate pattern, may be used by the roast degree determination unit 133 to identify the appropriate roasting degree of the coffee beans 10, e.g. the initial roasting degree.

It is noted for the avoidance of doubt that the further defined amount of weight loss may be the same as or different to the defined amount of weight loss referred to in the initial series of timings performed by the timing unit 131. Similarly, the series of further timings may include the same number or a different number of timings as the initial series of timings performed by the timing unit 131, i.e. N may be the same or different in the subsequent series of timings.

The control unit 134 may be adapted to control the heating arrangement in response to the weight loss rate determination facilitated by the sensor unit 120. In an embodiment, the control unit 134 may be adapted to select an appropriate roasting profile for the coffee beans 10 in response to the determination of the initial roasting degree of the coffee beans 10 by the roast degree determination unit 133, i.e. the roasting degree of the coffee beans 10 when they were placed in the compartment 110 of the apparatus 100. Such a roasting profile may for instance configuration data of the control unit 134 such that the control unit 134 is configured to provide the roasting element 140 with the appropriate control signals over a period of time to establish the desired roasting degree of the coffee beans 10 from the established initial roasting degree of these coffee beans 10. For instance, the control unit 134 may be controlled by the processor 130 in accordance with weight loss data as depicted in Table II. In an embodiment, the apparatus 100 may further comprise a data storage element such as a RAM or Flash memory, look-up table or the like that is communicatively coupled to the control unit 134 for storing a roasting profile of the coffee beans 10.

In an example embodiment, the control unit 134 may be adapted to engage the roasting element for a set period of time upon determination of the initial roasting degree of the coffee beans 10. The set period of time may correspond to a user-defined degree of roasting of the coffee beans 10, where a longer period of time typically corresponds to a darker roast of the coffee beans 10. To this end, the control unit 134 may include or may have access to a look-up table or the like in which a time period is defined as a function of roasting degree. The control unit 134 may further include a timer for controlling the roasting element in accordance with the set period of time. As it is well-known per se to control a heating arrangement of coffee roasting apparatus 100 using time as a control parameter, this will not be explained in further detail for the sake of brevity only. It is simply noted that the time control aspect of the aforementioned embodiment may be implemented in any suitable manner.

Alternatively or additionally, the control unit 134 may be adapted to control the roasting process as a function of the weight loss rate from the coffee beans 10. In particular, the control unit 134 may control the roasting element 140 as a function of this weight loss, and may terminate, i.e. disengage, the roasting element 140 upon the coffee beans 10 having lost a defined amount of weight, i.e. the coffee beans 10 having reached the target amount of weight loss. As explained above, the target amount of weight loss typically corresponds to a desired roasting degree, such that the control of the roasting process in this manner may yield excellent consistency between different instances of the roasting process.

In an embodiment, the control unit 134 may control the roasting element 140 as a function of the weight loss rate from the coffee beans 10 in combination with a defined amount of time for which the roasting element 140 should be engaged. For instance, the processor 130 may be configured to determine an intermediate weight loss rate from the coffee beans 10, which intermediate weight loss rate is used as a reference point from which the roasting process is completed using a defined amount of time. For instance, an intermediate point in the roasting process, e.g. the completion of the first cracking of the coffee beans 10, may be determined by monitoring the weight loss rate from the coffee beans 10, after which the roasting process may be completed by roasting the coffee beans 10 for a fixed amount of time, which fixed amount is a function of the desired roasting degree of the coffee beans 10. This for instance may be beneficial if the loss of weight by the coffee beans 10 after the intermediate point, e.g. the point of first cracking of the coffee beans 10, is relatively modest, such that accurate detection of the weight loss rate may become difficult within the resolution of the sensor 120. In such a scenario, the initial control of the roasting process using weight loss rate as the control parameter followed by the completion of the roasting of the coffee beans 10 using a fixed amount of time may further improve the consistency of the roasting process.

In an embodiment, the apparatus 100 may comprise additional sensors providing sensing data that can be used to assist the control unit 134 in controlling the roasting element 140. For instance, a sensor for determining the colour of the coffee beans 10 and/or a temperature sensor for determining the temperature of the coffee beans 10 may be included, wherein the control unit 134 is adapted to control the roasting element 140 as a function of the weight loss of the coffee beans 10 in combination with the data from the one or more additional sensors in the compartment 110 of the apparatus 100.

The control unit 134 may be responsive to a user interface 150, which for instance may facilitate a user specifying the desired roasting degree of the coffee beans 10 in any suitable manner, e.g. using a dial, a series of buttons, a programmable display, which may be a touch-screen display and so on. Any suitable type of user interface 150 may be used for this purpose. As such user interfaces are well-known per se, they will not be explained in further detail for the sake of brevity only.

Figure 3:
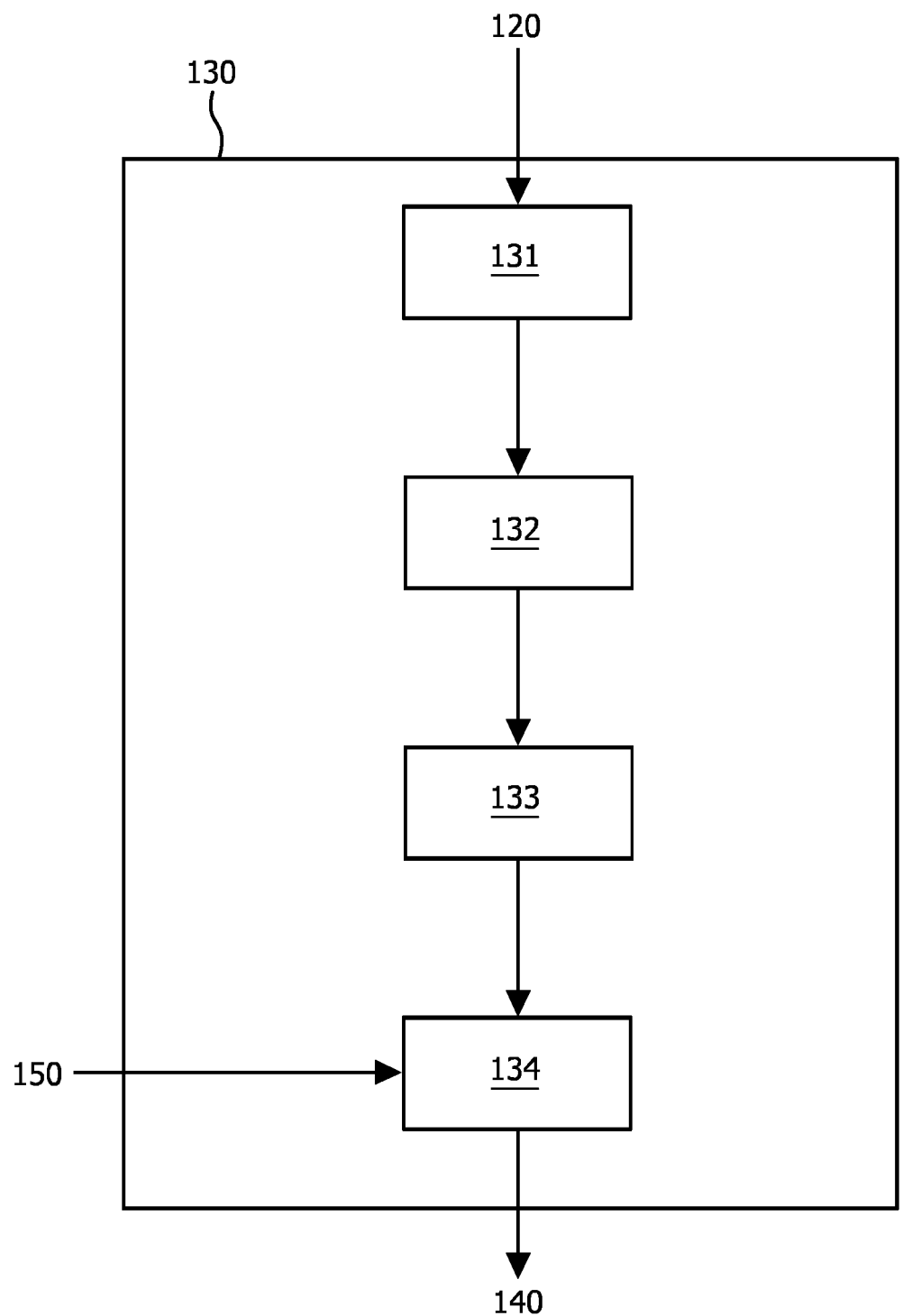
FIG. 3 schematically depicts an aspect of the coffee roasting apparatus of FIG. 1 or 2.

It will be understood that these embodiments are non-limiting examples of possible arrangements and that many other arrangements are equally suitable; for instance, even though the embodiments of the apparatus 100 as shown in FIG. 1-3 have been explained using a processor 130 comprising discrete components, i.e. a discrete timer unit 131, rate calculation unit 132, roast degree determination unit 133 and control unit 134, it should be understood that such discrete components were shown for the sake of more clearly explaining the concepts of at least some embodiments of the present invention, and that FIG. 1-3 should not be construed in a manner such that embodiment of the present invention would be limited to the present of such discrete components. It is equally feasible that at least some of the discrete components form part of a single arrangement; for instance, the timer unit 131 may form part of the rate calculation unit 132, the roast degree determination unit 133 may form part of the rate calculation unit 132 and/or the control unit 134 and so on.

Moreover, at least some of these components do not require realization in hardware; it is for instance equally feasible that at least some of these components are realized in software or firmware executed on a processor of the processor 130.

Furthermore, it should be understood that at least some of these components may form part of a different entity of the coffee roasting apparatus 100; for instance, at least some of these components may form part of the sensor unit 120 and/or the heating arrangement of the coffee roasting apparatus 100.

It should furthermore be understood that the processor 130 is not limited to the embodiment shown in FIG. 3; it is equally feasible that at least some of the units shown in FIG. 3 may be omitted or that additional units may be present. For instance, the coffee roasting apparatus 100 may be configured to allow a user to specify the initial roasting degree of the coffee beans 10, thus obviating the need for the presence of a timer unit 131, a rate calculation unit 132 and/or a roast degree determination unit 133. The user may specify the initial roasting degree in any suitable manner, e.g. using the user interface 150. Alternatively, the apparatus 100 may include a roasting level detection device (not shown) such as a barcode reader, near-field communication device or the like for obtaining the initial roasting degree of the coffee beans 10 from the packaging of the coffee beans, which packaging for instance may comprise a barcode, a RFID chip and so on storing information concerning the initial roasting degree of the coffee beans.

The apparatus 100 may be integrated in a coffee machine further comprising a coffee bean grinding device and a coffee brewing device. For instance, the coffee machine may be arranged to automatically transfer a portion of the roasted coffee beans into the coffee bean grinding device for grinding, after which the ground coffee is automatically transported into the coffee brewing device for brewing a fresh cup of coffee. As such coffee machine are well-known per se, this will not be explained in further detail for reasons of brevity only. It should be understood that the particular embodiment of such a coffee machine is not critical to the present invention and that any suitable arrangement of such coffee machine may be contemplated.

Aspects of the present invention will now be explained in further detail with the aid of the following non-limiting examples. It should be understood that these non-limiting examples are for illustrative purposes only and should not be interpreted in a manner limiting the scope of the present invention.

Example 1

60 grams of green Yirgacheffe coffee beans having an initial moisture content of about 11.10% were roasted in a Nesco home coffee roaster, and periodically removed from the roaster to determine their weight.

Example 2

60 grams of partially roasted Yirgacheffe coffee beans having an initial moisture content of about 7.70% by weight were roasted in a Nesco home coffee roaster, and periodically removed from the roaster to determine their weight.

Example 3

60 grams of partially roasted Yirgacheffe coffee beans having an initial moisture content of about 4.30% by weight were roasted in a Nesco home coffee roaster, and periodically removed from the roaster to determine their weight.

Example 4

60 grams of green Mandheling coffee beans having an initial moisture content of about 12.10% were roasted in a Nesco home coffee roaster, and periodically removed from the roaster to determine their weight.

Example 5

60 grams of partially roasted Mandheling coffee beans having an initial moisture content of about 3.20% by weight were roasted in a Nesco home coffee roaster, and periodically removed from the roaster to determine their weight.

Figure 5:
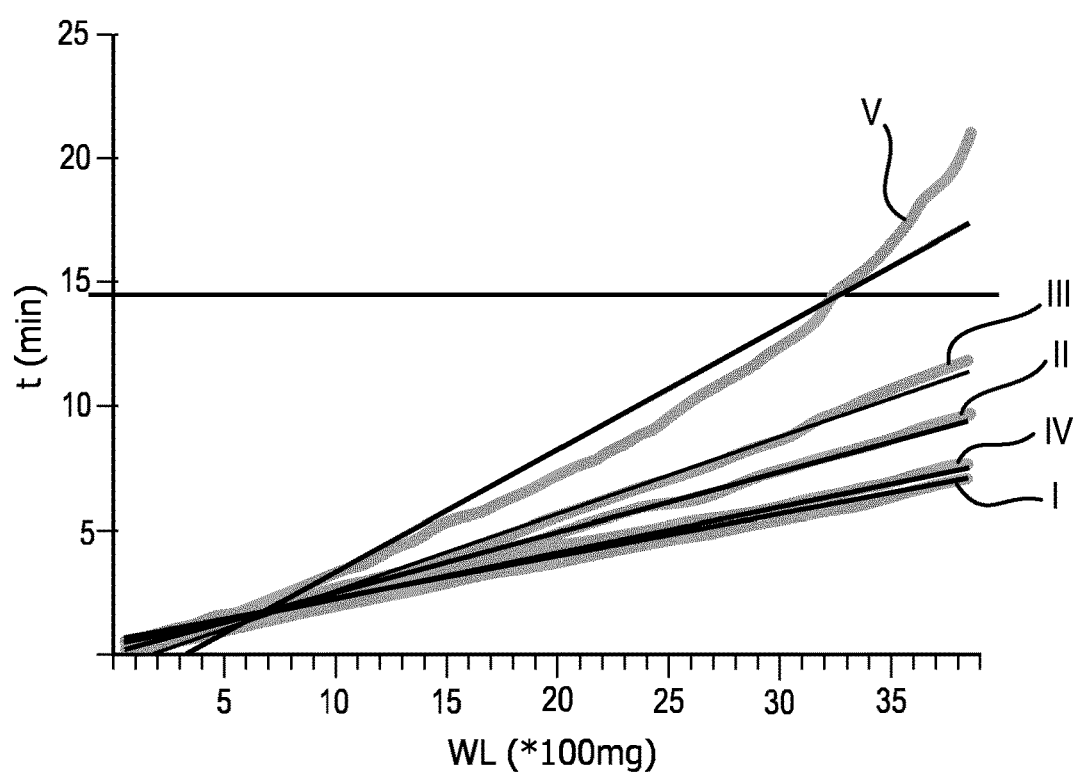
FIG. 5 schematically depicts a roasting profile of coffee beans in terms of weight loss (WL) in the coffee beans over time (t) during roasting.

The weight loss results of examples 1-5 are depicted in FIG. 5. The weight loss curves of the coffee beans used in examples 1-5 are labeled by Roman numerals I-V respectively. As can be seen from FIG. 1-5, different initial roasting degrees of the coffee beans 10 has a marked influence of the weight loss rate exhibited by the coffee beans 10. The coincidence of curves I and IV demonstrates that the weight loss rate is largely independent of coffee bean variety, as the Yirgacheffe and Mandheling green coffee beans exhibit a near-identical weight loss rate.

Moreover, curves II, III and V clearly demonstrate that different initial roasting degrees exhibit different weight loss rates, with deeper roasted coffee beans exhibiting a higher weight loss rate. This can be understood by the fact that deeper partially roasted coffee beans will complete their first cracking more quickly, with the first cracking process typically exhibiting accelerated moisture loss due to the cracking and pore formation in the coffee beans. Examples 1-5 therefore provide proof of the concept that an initial roasting degree of the coffee beans 10 can be determined from their weight loss rate.

This can be further derived from the straight solid lines in FIG. 5, which depict a linear approximation of the weight loss rate of the coffee beans of examples 1-5 respectively. The linear approximations give an excellent fit for examples 1-4 but less so for example 5, which can be understood by the partially roasted Mandheling coffee beans of example 5 entering the first cracking process during which weight loss is accelerated as explained above.

It has furthermore been found that by increasing the number N of weight sample points in the determination of a partial roasting levels, e.g. from N=10 to N=20 or N=40, the weight loss rates exhibit non-linearity to a greater extent, with the amount of non-linearity being linked to the relevant initial roasting degree. It has therefore also proven possible to determine the initial roasting degree of the coffee beans 10 using trends in the weight loss rate of the coffee beans 10.

The above also demonstrates that the coffee roasting apparatus 100 may be configured to monitor the change of the weight loss rate of the coffee beans 10, with an increase in this rate indicating the start of the first cracking process and a subsequent reduction in this rate indicating the completion of the first cracking process. This for instance may be used to determine the aforementioned intermediate weight loss point after which the remainder of the roasting process may be controlled using a defined amount of roasting time from the point of reaching the intermediate amount of weight loss, as previously explained.

Example 6

Three batches of 120 g of green Yirgacheffe coffee beans were roasted in a Hearthware iRoast coffee roaster periodically weighed to determine the weight loss of the coffee beans. The roasting process was terminated once the coffee beans had lost 12% of their initial weight, after which the color of the roasted coffee beans was determined in a Hunterlab color device.

Example 7

Three batches of 120 g of green Yirgacheffe coffee beans were roasted in a Hearthware iRoast coffee roaster periodically weighed to determine the weight loss of the coffee beans. The roasting process was terminated once the coffee beans had lost 14% of their initial weight, after which the color of the roasted coffee beans was determined in a Hunterlab color device.

Example 8

Three batches of 120 g of green Yirgacheffe coffee beans were roasted in a Hearthware iRoast coffee roaster periodically weighed to determine the weight loss of the coffee beans. The roasting process was terminated once the coffee beans had lost 16% of their initial weight, after which the color of the roasted coffee beans was determined in a Hunterlab color device.

The thus obtained color results for Examples 6-8 are shown in Table 3.

| | color | | |
|---|---|---|---|
| | Roasting degree 1 (12%) | Roasting degree 2 (14%) | Roasting degree 3 (16%) |
| Batch 1 | 40.20 | 38.20 | 37.44 |
| Batch 2 | 40.66 | 38.10 | 37.61 |
| Batch 3 | 40.10 | 38.25 | 37.20 |
| Average color | 40.32 ± 0.3 | 38.18 ± 0.08 | 37.42 ± 0.2 |

Comparative Example 1

Four batches of 120 g Yirgacheffe green coffee beans were roasted for the same fixed amount of time in a Hearthware iRoast coffee roaster, after which the color of the roasted coffee beans was determined in a Hunterlab color device. The results are shown in Table 4 below.

TABLE 4

| Batch | Roasting color |
|---|---|
| 1 | 38.80 |
| 2 | 38.21 |
| 3 | 37.45 |
| 4 | 36.82 |
| Average Color | 37.70 ± 0.7 |

Comparing the roasting results of Examples 6-8 with the roasting results of Comparative Example 1 clearly demonstrates that by controlling the roasting process using weight loss rate as the control parameter rather than a fixed amount of time only, i.e. by controlling the entire roasting process by time only, a significant improvement in the consistency of the degree of roasting is obtained.

Figure 6:
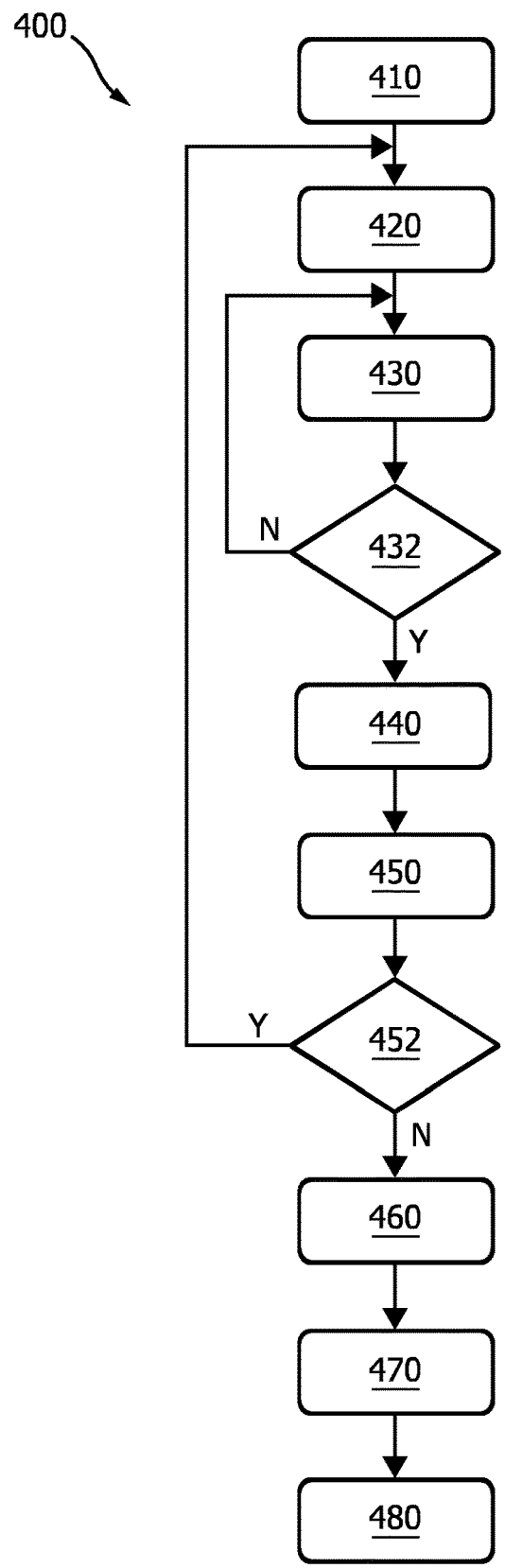
FIG. 6 schematically depicts a flowchart of a coffee roasting method according to an embodiment.

An example embodiment of the coffee brewing method 400 according to the present invention will now be explained in further detail with the aid of FIG. 6, which depicts a flowchart of this example embodiment. The method starts in step 410 for instance with the switching on of the apparatus 100 and/or the filling of the compartment 110 with the coffee beans 10 to be roasted. At this point, a user may also specify the desired roasting degree of the coffee beans 10, e.g. using the user interface 150. The method then proceeds to step 420 in which a first weight of the coffee beans 10 is determined, after which a subsequent weight of the coffee beans 10 is determined in step 30, e.g. at a determined amount of time after the first weight determination in step 420.

In step 432, it may be checked if a further subsequent weight determination of the coffee beans 10 is required, for instance to facilitate the determination of weight loss rate of the coffee beans 10 based on more than two weight measurements. If it is determined that a further subsequent rate measurement should be performed, the method returns to step 430; otherwise, the method proceeds to step 440 in which the weight loss rate is calculated from the timed weight loss determinations of steps 420 and 430, after which the method may proceed to step 450 in which the roasting degree of the coffee beans 10 is determined based on the weight loss rate determined in step 440.

The method may then proceed to optional step 452, in which it is checked if a further weight loss rate of of the coffee beans 10 has to be determined, for instance to verify if the weight loss rate determined in step 440 from the first series of weight determinations and the roasting degree of the coffee beans 10 determined in step 450 is correct. If it is decided that such a further rate should be determined, the method refers back to step 420, in which case step 450 may include the additional step of verifying the determined roasting degree of the coffee beans 10 and correcting the determined roasting degree if necessary.

The method subsequently proceeds to step 460 in which a roasting profile for the coffee beans 10 is selected based on the determined roasting degree of the coffee beans 10, e.g. by determining a remaining roasting time and/or a remaining amount of weight loss for the coffee beans 10 for the remainder of the roasting process. The roasting process of the coffee beans 10 is then completed in step 470 in accordance with the roasting profile selected in step 460, after which the roasting process is terminated in step 480, as the roasting process is complete.

It should be understood that the above method 400 is merely an example embodiment of such a roasting method, and that many variations will be apparent to the skilled person. For instance, rather than performing steps 420, 430, 432 440, 450 and 452 to determine an initial roasting level of the coffee beans 10 at the initial stage of roasting, these steps may be omitted if the initial roasting level of the coffee beans is entered into the apparatus 100, e.g. user-defined or otherwise retrieved from the packaging of the coffee beans 10 as previously explained.

Also, step 460 may define the roasting profile in terms of a reference weight loss rate to be determined in combination with a fixed amount of roasting time to be applied to the coffee beans 10 upon detecting the reference amount of weight loss rate, in which case the roasting element 140 is controlled by the control unit 134 accordingly to roast the coffee beans 10 in accordance with such a roasting profile in step 470.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. An apparatus for roasting coffee beans, the apparatus comprising:
   a compartment for holding coffee beans;
   a roasting element for roasting the coffee beans in the compartment; and
   a processor comprising a control unit for controlling the roasting element,
   wherein the processor is adapted to determine a weight loss rate of the coffee beans, wherein the weight loss rate of the coffee beans is a ratio of: a) a difference between a first weight measurement of the coffee beans and a subsequent weight measurement at which the first weight measurement of the coffee beans has reduced by a defined amount, and b) a time elapsed between the first weight measurement and the subsequent weight measurement, and wherein the control unit is adapted to control the roasting element as a function of the determined weight loss rate of the coffee beans.

2. The apparatus of claim 1, further comprising a sensor for monitoring a weight of the coffee beans, wherein the processor is adapted to determine the weight loss rate in response to the sensor.

3. The apparatus of claim 2, wherein the processor further comprises a timer unit responsive to the sensor for determining the time elapsed between the first weight measurement of the coffee beans and the subsequent weight measurement at which the first weight measurement of the coffee beans has reduced by the defined amount.

4. The apparatus of claim 3, wherein the timer unit is adapted to determine the elapsed time from a series of weight measurements including the first weight measurement and the subsequent weight measurement, and wherein the processor further comprises a rate calculation unit communicatively coupled to the timer unit for calculating the weight loss rate from the determined elapsed time.

5. The apparatus of claim 4, wherein the processor further comprises a roast degree determination unit responsive to the rate calculation unit for determining a roasting degree of the coffee beans on the basis of the calculated weight loss rate.

6. The apparatus of claim 5, wherein the control unit is further adapted to select a roasting profile for the coffee beans as a function of the determined roasting degree.

7. The apparatus of claim 5, wherein the control unit is further adapted to disengage the roasting element as a function of the determined roasting degree and a desired roasting degree.

8. The apparatus of claim 5, wherein the processor is further adapted to define the weight loss from the coffee beans as a function of the determined roasting degree and a desired roasting degree, and wherein the control unit is further adapted to disengage the roasting element upon the coffee beans having lost the defined weight loss.

9. The apparatus of claim 1, wherein the weight loss rate comprises an initial weight loss rate determined at an initial stage of roasting, and wherein the control unit is adapted to control the roasting element as a function of the determined initial weight loss rate of the coffee beans.

10. The apparatus of claim 1, further comprising a user interface for receiving input from a user regarding a desired roasting degree of the coffee beans, wherein the control unit is responsive to the user interface.

11. A coffee machine, the coffee machine comprising:
    an apparatus according to claim 1 for roasting coffee beans;
    a grinding device for grinding the roasted coffee beans to coffee powder; and
    a brewing device for brewing coffee from the coffee powder.

12. A method of roasting coffee beans, the method comprising:
    roasting coffee beans in a compartment;
    determining a weight loss rate of the coffee beans during the roasting, wherein the weight loss rate of the coffee beans is a ratio of: a) a difference between a first weight measurement of the coffee beans and a subsequent weight measurement at which the first weight measurement of the coffee beans has reduced by a defined amount, and b) a time elapsed between the first weight measurement and the subsequent weight measurement;
    selecting a roasting profile for the coffee beans based on the determined weight loss rate; and
    completing the roasting of the coffee beans using the selected roasting profile.

13. The method of claim 12, wherein the step of determining a weight loss rate comprises:
    monitoring a weight of the coffee beans;
    determining the time elapsed between the first weight measurement of the coffee beans and the subsequent weight measurement at which the first weight measurement of the coffee beans has reduced by the defined amount; and
    calculating the weight loss rate from the determined elapsed time.

14. The method of claim 12, wherein the step of selecting a roasting profile comprises defining the weight loss from the coffee beans in response to the determined weight loss rate, and wherein the step of completing the roasting comprises terminating the roasting of the coffee beans upon the coffee beans having lost the defined weight loss.

15. The method of claim 12, wherein the step of determining a weight loss rate comprises determining an initial weight loss rate at an initial stage of roasting, and wherein the step of selecting a roasting profile for the coffee beans comprises selecting a roasting profile on the basis of the determined initial weight loss rate.

* * * * *